(12) United States Patent
Kang et al.

(10) Patent No.: US 11,549,567 B2
(45) Date of Patent: Jan. 10, 2023

(54) LOCK-UP DEVICE FOR TORQUE CONVERTER

(71) Applicant: Valeo Kapec Co., Ltd., Daegu (KR)

(72) Inventors: Juseok Kang, Daegu (KR); Sangmin Yang, Daegu (KR); Eu Sub Kwon, Daegu (KR); Soon-Cheol Shin, Suwon-si (KR)

(73) Assignee: Valeo Kapec Co., Ltd., Daegu (KR)

( * ) Notice: Subject to any disclaimer, the term of this patent is extended or adjusted under 35 U.S.C. 154(b) by 475 days.

(21) Appl. No.: 16/728,178

(22) Filed: Dec. 27, 2019

(65) Prior Publication Data

US 2020/0208712 A1 Jul. 2, 2020

(30) Foreign Application Priority Data

Dec. 28, 2018 (KR) .................... 10-2018-0171782
May 29, 2019 (KR) .................... 10-2019-0063067

(51) Int. Cl.
| | | |
|---|---|---|
| *F16H 45/02* | (2006.01) | |
| *F16F 15/131* | (2006.01) | |
| *F16D 33/18* | (2006.01) | |
| *F16D 33/16* | (2006.01) | |

(52) U.S. Cl.
CPC .......... *F16F 15/1315* (2013.01); *F16D 33/16* (2013.01); *F16D 33/18* (2013.01); *F16H 45/02* (2013.01); *F16H 2045/0226* (2013.01)

(58) Field of Classification Search
CPC ................. F16F 15/1315; F16H 45/02; F16H 2045/0226
See application file for complete search history.

(56) References Cited

U.S. PATENT DOCUMENTS

| | | | |
|---|---|---|---|
| 9,739,359 B2 * | 8/2017 | Okaji | ........ F16H 45/02 |
| 2013/0205944 A1 * | 8/2013 | Sudau | ........ F16F 7/1034 |
| | | | 74/573.1 |

FOREIGN PATENT DOCUMENTS

| | | |
|---|---|---|
| JP | 2009-115112 A | 5/2009 |
| JP | 2016-3685 A | 1/2016 |
| KR | 10-2017-0002387 A | 1/2017 |

* cited by examiner

*Primary Examiner* — Huan Le
(74) *Attorney, Agent, or Firm* — Oblon, McClelland, Maier & Neustadt, L.L.P.

(57) ABSTRACT

A lock-up device for a torque converter is provided with a simple structure which reduces manufacturing costs, and which may reduce a size of the entire torque converter by minimizing an installation space of a dynamic damper.

5 Claims, 9 Drawing Sheets

LOCK-UP DEVICE FOR TORQUE CONVERTER

CROSS-REFERENCE TO RELATED APPLICATION

This application claims priority to and the benefit of Korean Patent Application No. 10-2018-0171782 filed in the Korean Intellectual Property Office on Dec. 28, 2018, and Korean Patent Application No. 10-2019-0063067 filed in the Korean Intellectual Property Office on May 29, 2019, the entire contents of which are incorporated herein by reference.

BACKGROUND OF THE INVENTION

(a) Field of the Invention

The present invention relates to a lock-up device used in a torque converter as a power delivery device of a fluid type, and more particularly relates to a lock-up device for a torque converter, which may reduce a manufacturing cost by providing a simpler structure than a conventional one, and may reduce a size of the torque converter as a whole by minimizing an installation space of a dynamic damper.

(b) Description of the Related Art

As a power delivery device of a fluid type for transmitting power generated from an engine of a vehicle to a transmission, a torque converter particularly having a lock-up device has been widely applied.

The lock-up device is a device that transmits a torque by mechanically connecting a front cover of the torque converter and a turbine, and is disposed in a space between the turbine and the front cover. This lock-up device transfers the torque directly from the front cover to the turbine without passing through an impeller.

Generally, the lock-up device has a piston and a damper mechanism.

The piston is disposed to be movable along a rotation axis direction, and if the piston is pressed against the front cover, the piston engages with the front cover and rotates by receiving the torque from the front cover through a friction force.

The damper mechanism absorbs and attenuates the torsional vibration transmitted to the front cover and transmits it to the output member, and includes an elastic member that elastically connects the input member and the output member that rotates integrally with the piston, preferably a coil spring.

On the other hand, in addition to the damper mechanism for the purpose of absorbing and damping the torsional vibration, as a technology for improving vibration damping performance by lowering a resonance frequency below a practical rotation speed, a technology related to a dynamic damper configured by installing an inertial mass body on a torque transmission path has been developed and applied.

In this regard, Korean Patent Publication No. 10-1220123 discloses a dynamic damper including a connecting member in which an inertial mass body is fixed at one end, and a coil spring for elastically connecting the other end of the connecting member and the output member.

However, the dynamic damper disclosed in the prior document has a problem that the cost of the product increases and has a rather complicated structure because the inertial mass body is configured to be connected to the coil spring through a separate connecting member.

In addition, the dynamic damper disclosed in the prior document has a structure in which the inertial mass body is installed outside the radial direction of the coil spring of the damper mechanism, so that a separate installation space for the inertial mass body must be secured inside the torque converter, and there is a problem that this increases the entire size thereof.

PRIOR DOCUMENT

Patent Document (Patent Document 0001) Korean Registered Patent Publication No. 10-1220123

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been devised to solve the above problems to provide a lock-up device for a torque converter installing an inertial mass body directly on an output member to omit a connection member, thereby simplifying the structure and reducing the manufacturing cost.

In addition, the present invention provides a torque converter for a torque converter installing an inertial mass body inside a radius direction for a coil spring constituting a damper mechanism, thereby reducing an installation space for an inertial mass body to reduce an overall size and to be compacted.

A lock-up device for a torque converter according to the present invention includes: an input member to which a torque is input from a front cover through a friction force; an output member connected to a turbine to be integrally rotated and provided to be relatively rotatable with respect to the input member; a first elastic member and a second elastic member elastically connecting the input member and the output member in a rotational direction, respectively; and a dynamic damper directly installed to the output member, wherein the first elastic member is disposed outside in the radial direction with respect to the second elastic member, and the dynamic damper is disposed between the first elastic member and the second elastic member in the radial direction.

The dynamic damper may include: an inertial mass body disposed to be in close contact with the output member so as to be relatively rotatable with respect to the output member; and a third elastic member elastically connecting the inertial mass body and the output member with respect to the rotational direction, while the inertial mass body and the third elastic member may be disposed to at least partially overlap the first elastic member with respect to a rotation axis direction when viewing in the radial direction.

The inertial mass may body include: a first mass plate disposed in close contact with one side surface of the output member; and a second mass plate disposed in close contact with the other side of the output member and integrally rotating with the first mass plate, while the first mass plate and the third elastic member are disposed to entirely overlap the first elastic member with respect to the rotation axis direction when viewing in the radial direction.

The dynamic damper may further include an additional mass body to increase inertia, and the additional mass body is disposed in the radial direction inside of the second mass plate and is connected to the second mass plate.

The additional mass body may be integrally formed with the second mass body.

The additional mass body may be manufactured separately from the second mass body and is fixed to the second mass body.

Compression of the second elastic body may be started after the first elastic body is maximally compressed by the rotation of the input member.

The lock-up device for the torque converter according to the present invention has the effect of simplifying the structure and reducing the manufacturing cost by omitting the connecting member by configuring the inertial mass directly on the output member.

In addition, the lock-up device for a torque converter according to the present invention, by installing the inertial mass body in the radial direction inside with respect to the coil spring constituting the damper mechanism, may reduce the installation space for the inertial mass body to reduce the overall size and to be compactable.

DETAILED DESCRIPTION OF THE EMBODIMENTS

Hereinafter, a lock-up device for a torque converter according to the present invention is described with reference to accompanying drawings.

As the invention allows for various changes and numerous embodiments, particular embodiments will be illustrated in the drawings and described in detail in the written description. This, however, is by no means meant to restrict the invention to the specific embodiments, and it is to be understood to include all changes, equivalents, and substitutes included in the spirit and scope of the present invention.

In the following description of the present invention, terms including ordinal numbers such as first, second, and the like may be used to describe various constituent elements, however the constituent elements are not limited by the terms. The terms are used only to distinguish one constituent element from other constituent elements. For example, a first constituent element may be referred to as a second constituent element, and similarly, the second constituent element may be referred to as the first constituent element within the scope of the appended claims.

Also, a term "and/or" includes a combination of a plurality of described items or any item among the plurality of described items.

Also, in this specification, it is to be understood that when one component is referred to as being "connected" or "coupled" to another component, it may be connected or coupled directly to the other component or may be connected or coupled to another component with the other component intervening therebetween. On the other hand, in this specification, it is to be understood that when one component is referred to as being "connected or coupled directly" to another component, it may be connected or coupled to the other component without another component intervening therebetween.

It is also to be understood that the terminology used herein is only for the purpose of describing particular embodiments, and is not intended to be limiting of the invention. Singular forms are to include plural forms unless the context clearly indicates otherwise.

It will be further understood that term "comprises" or "have" used in the present specification specify the presence of stated features, numerals, steps, operations, components, parts, or a combination thereof, but does not preclude the presence or addition of one or more other features, numerals, steps, operations, components, parts, or a combination thereof.

Unless indicated otherwise, all the terms used herein, including technical or scientific terms, have the same meanings as those generally understood by those with ordinary knowledge in the field of art to which the present invention belongs. It must be understood that the terms defined by the dictionary are consistent with the meanings within the context of the related art, and they should not be ideally or excessively formally defined unless the context clearly dictates otherwise.

Also, the present embodiments are provided so that this disclosure will be thorough and complete, and will fully convey the scope of the invention to those skilled in the art, and in the drawings, the shapes and dimensions may be exaggerated for clarity.

<Overall Configuration of a Torque Converter>

Figure 1:
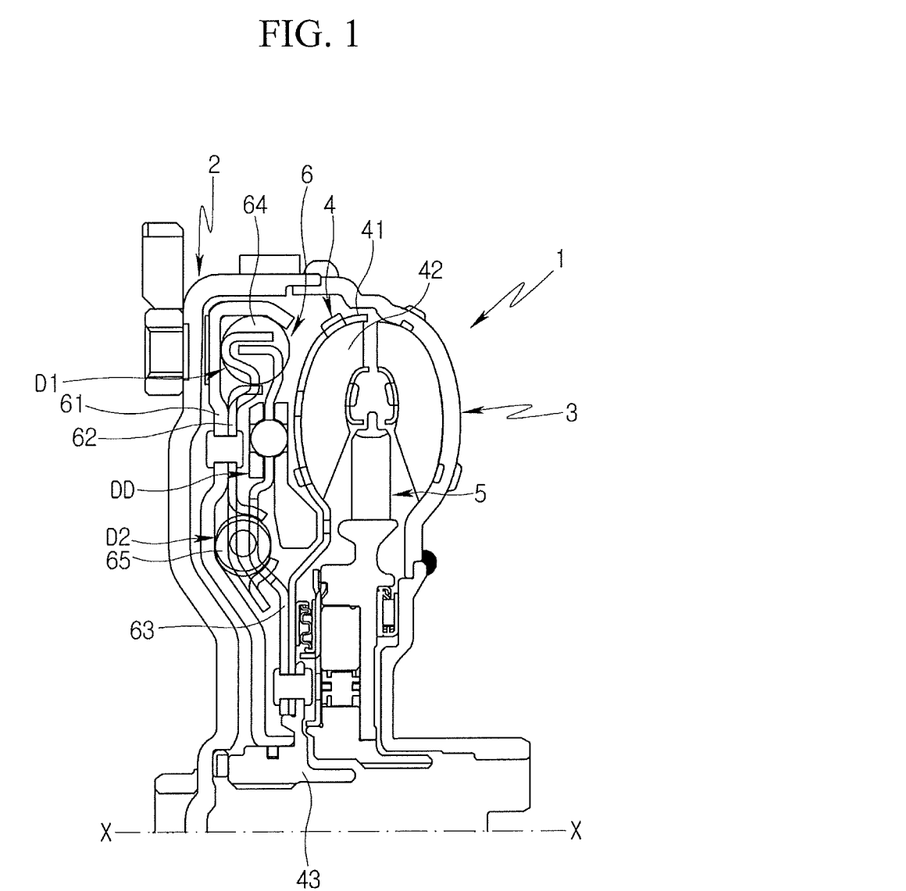
FIG. 1 is a cross-sectional view of a torque converter including a lock-up device in a rotation axis line direction according to an exemplary embodiment of the present invention.
Figure 2:
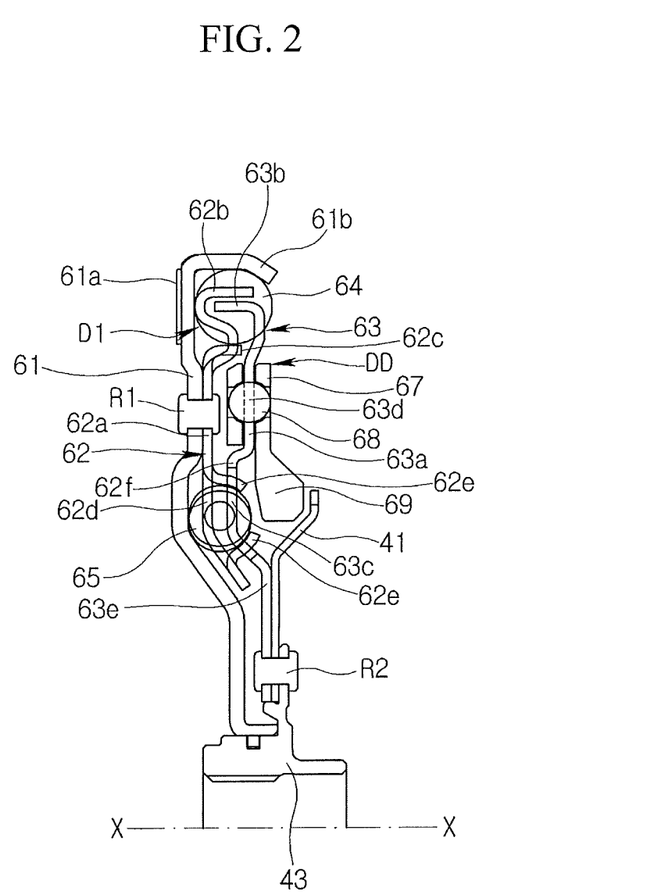
FIG. 2 is a partial enlarged view of FIG. 1.
Figure 3:
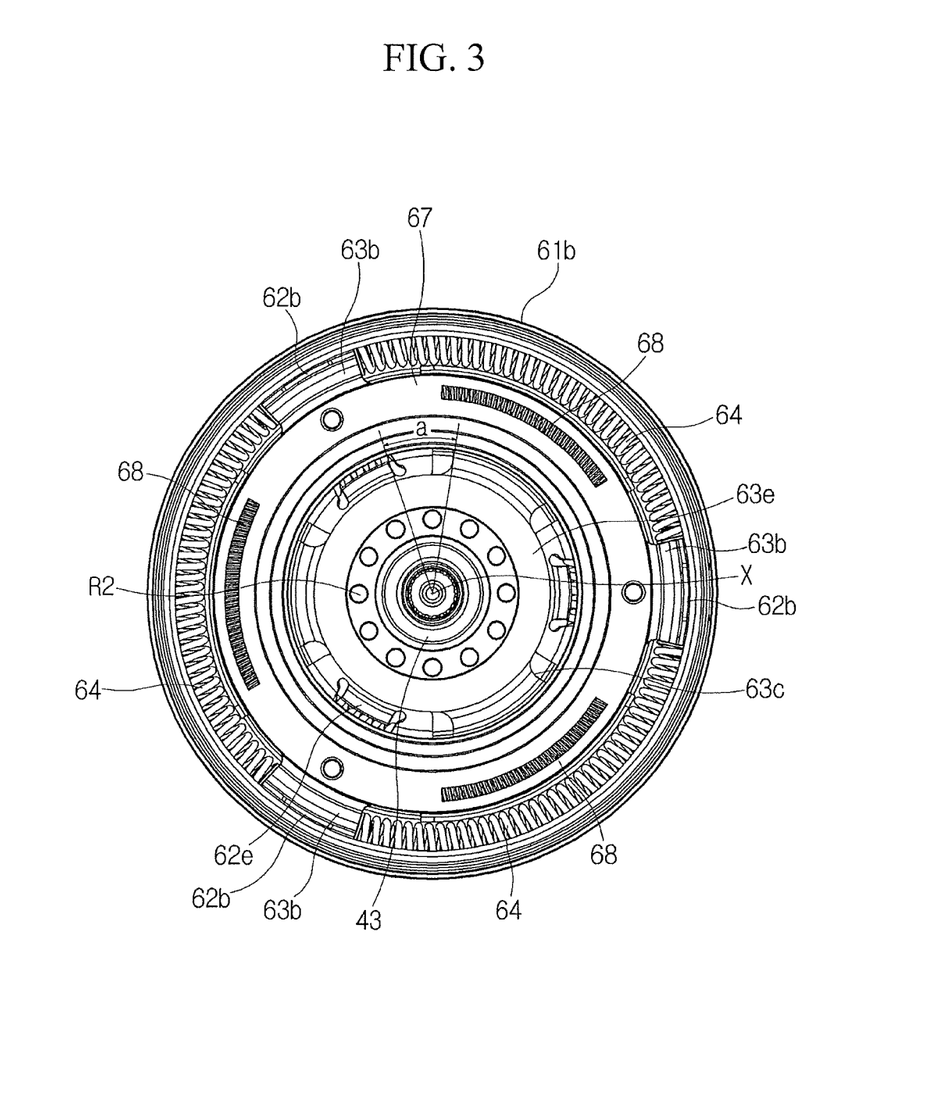
FIG. 3 is a cross-sectional view of a torque converter shown in FIG. 1 in a direction perpendicular to a rotation axis line.

FIG. 1 is a cross-sectional view of a torque converter 1 including a lock-up device in a rotation axis line direction according to an exemplary embodiment of the present invention, FIG. 2 is a partial enlarged view of FIG. 1, and FIG. 3 is a cross-sectional view of a torque converter 1 shown in FIG. 1 in a direction perpendicular to a rotation axis line. An overall configuration of a torque converter 1 having a lock-up device 6 according to the embodiment of the present invention is described with reference to FIG. 1 to FIG. 3.

The torque converter 1 is a device for transmitting power from a crankshaft of an engine (not shown) to an input shaft of a transmission (not shown), and is configured including a front cover 2 to which a torque of a crankshaft is input, an impeller 3 connected to the front cover 2, a turbine 4 connected by an output hub 43, a stator 5 disposed between the impeller 3 and the turbine 4, and the lock-up device 6 disposed between the front cover 2 and the turbine 4

The impeller 3 is fixed to the front cover 2, and a fluid chamber is formed therein by the front cover 2 and the impeller 3.

The turbine 4 is disposed to face the impeller 3 inside the fluid chamber. The turbine 4 includes a turbine shell 41, a plurality of turbine blades 42 fixed to the turbine shell 41, and the output hub 43 fixed to the turbine shell 41 by a rivet R2.

The output hub 43 is connected to an input shaft of the transmission (not shown).

The stator 5 is a mechanism for adjusting a flow of a hydraulic oil from the turbine 4 to the impeller 3, and is disposed between the impeller 3 and the turbine 4.

<Configuration of the Lock-Up Device>

The lockup device 6 serves to mechanically connect the front cover 2 and the turbine 4 as necessary, and is disposed in the space between the front cover 2 and the turbine 4 as shown in FIG. 1.

As shown in FIG. 2, the lock-up device 6 includes a piston 61 and a drive plate 62 as an input member, a driven plate 63 as an output member, a first damper D1 and a second damper D2 elastically connecting the drive plate 62 and the driven plate 63, respectively, as a damper mechanism, and a dynamic damper DD installed directly on the driven plate 63 for improving vibration damping performance.

Piston

The piston 61 functions to switch a torque transmission path between the front cover 2 and the turbine 4 and is installed to directly receive the torque of the front cover 2 through the friction force when it is pressed to the front cover 2 side by the action of the hydraulic pressure to be in close contact with the inner surface of the front cover 2.

For this, the end of the inner side of the piston 61 in a radial direction is supported to be movable by the output hub 43 in a rotation axis (X-X) direction, and is also supported to be relatively rotated with respect to the output hub 43. In addition, a friction member 61a as a means for increasing the friction force and effectively transmitting the torque of the front cover 2 to the piston 61 is installed on one side of the piston 61 facing the inner surface of the front cover 2.

On the other hand, the piston 61 of the lock-up device 6 according to an embodiment of the present invention, in addition to the function of switching the torque transmission path between the front cover 2 and the turbine 4 described above, performs a function of preventing the separation of a plurality of first coil springs 64 as the first damper D1 and a plurality of second coil springs 65 as the second damper D2 (to be described later) and effectively supporting them.

For the separation preventing and supporting of the first coil spring 64, a support edge 61b formed to be bent in the rotational axis X-X direction is provided on the outer circumferential side of the piston 61. As shown in FIG. 2, the support edge 61b is integrated with the piston 61 by forming a part of the outer circumference part of the piston 61 having a substantially disc shape to be bent in the rotational axis (X-X) direction, and the free end side of the support edge 61b is partially bent inward in the radial direction.

In order to separate and support the second coil spring 65, the inner circumferential surface of the piston 61 in the radially inner side in which the second coil spring 65 is disposed is partially bent to correspond to the shape of the second coil spring 65.

The separation of the first coil spring 64 and the second coil spring 65 in the radial direction and the rotation axis (X-X) direction may be prevented through the support edge 61b, the interior circumference shape of the piston 61, and an outer holding protrusion 62c and an inner holding protrusion 62e of the drive plate 62, and may be effectively supported through the relatively simple structure without adding a separate member.

Drive plate

The drive plate 62 is fixed to the above-described piston 61 to function as the input member along with the piston 61 and simultaneously perform a function of supporting the first coil spring 64 and the second coil spring 65 corresponding to the damper mechanisms D1 and D2.

The drive plate 62 is firmly fixed to the piston 61 at a plurality of positions through the rivet R1 so as to act as the input member together with the piston 61.

In addition, as a means for transmitting the input torque to the driven plate 63, which is described later, through the first coil spring 64 and the second coil spring 65, the drive plate 62 includes an outer locking portion 62b, an outer holding projection 62c, an inner locking portion 62d, and an inner holding projection 62e. The detailed configuration of the drive plate 62 is shown in FIG. 4.

Figure 4:
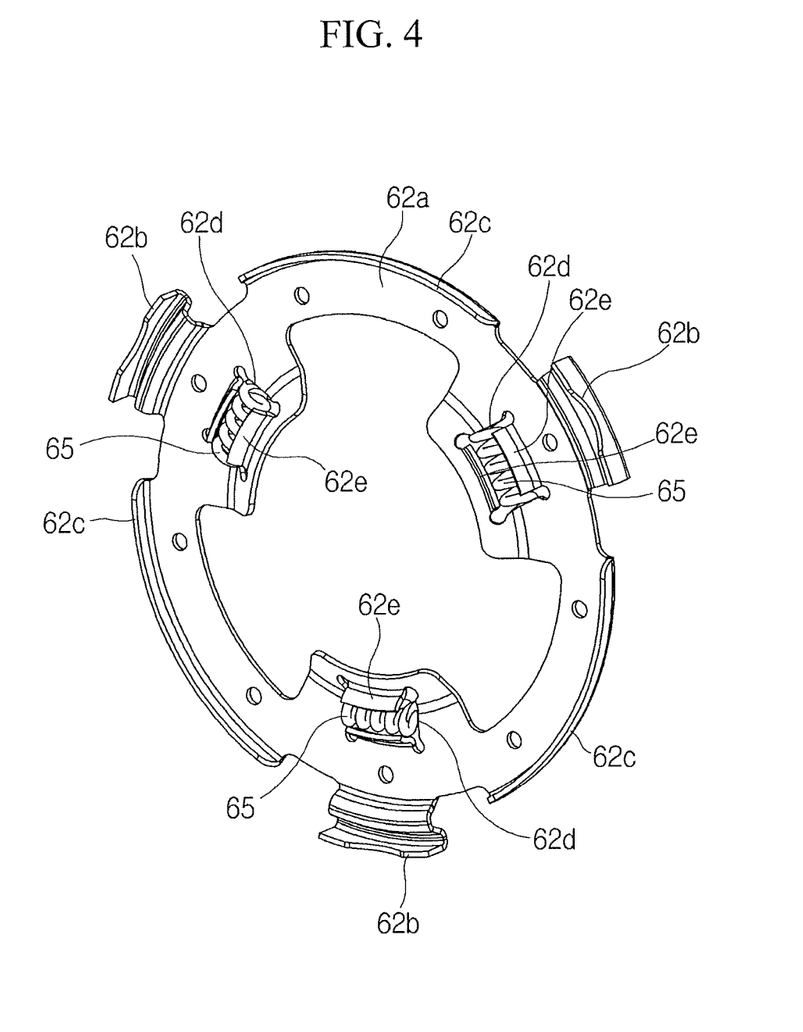
FIG. 4 is a perspective view of a drive plate of a lock-up device according to an exemplary embodiment of the present invention.

As shown in FIG. 4, the outer locking portion 62b as a part extending by bending a part of the exterior circumference of a main body portion 62a of the drive plate 62 in the rotation axis (X-X) direction is formed in plural throughout the exterior circumference of the main body portion 62a, is disposed between the ends of a plurality of first coil springs 64, and supports the end of the first coil spring 64 in the rotational direction.

The outer holding protrusion 62c is a portion for supporting the first coil spring 64 in the radial direction, is formed by cutting a portion of the outer circumferential portion of the main body portion 62a and bending it in the direction of the rotation axis (X-X) direction, and is provided between the rotational directions of the locking part 62b. The outer holding protrusion 62c is in contact with the first coil spring 64 in the radial direction inside, and the support edge 61b of the piston 61 described above is in contact with the first coil spring 64 in the radial direction outside, thereby the radial direction support structure of the first coil spring 64 is formed in this state.

The inner holding protrusion 62e is a portion for supporting the second coil spring 65 in the radial direction and the rotation axis (X-X) direction, is formed by partially cutting and bending a portion adjacent to the radially inner end of the main body portion 62a, and is formed as a pair, respectively, in the radially inner side and the radially outer side as shown. The pair of inner holding protrusions 62e cooperate with the inner surface of the above-described piston 61 to form the supporting structure of the second coil spring 65.

On the other hand, the second coil spring 65 is seated in an opening formed by being cut to form the inner holding protrusion 62e, both ends of the opening in the circumferential direction are in close contact with both ends of the second coil spring 65, and both ends thereof in the circumferential direction function as the inner locking portion 62d with respect to the second coil spring 65.

As such, the outer locking portion 62b, the inner locking portion 62d, the outer holding protrusion 62c, the inner holding protrusion 62e, and the like are formed by partially cutting or bending the main body portion 62a of the drive plate 62 and are integrally formed with the main body portion 62a. Therefore, since a separate member having the purpose of transmission of torque or the purpose of holding of the first coil spring 64 and the second coil spring 65 may be omitted, the structure of the lock-up device 6 may be simplified, and the manufacturing cost may be significantly reduced compared with the conventional art.

First Elastic Member—the First Coil Spring 64

The first coil spring 64 as a first elastic body constituting the first damper D1 has a function of elastically connecting the drive plate 62 and the driven plate 63 to be described later in the rotational direction to absorb a torsional vibration, and is supported by the support edge 61b of the piston 61, the outer holding projection 62c of the drive plate 62, and the inner surface of the piston 61 in the rotation axis (X-X) direction and the radius direction.

In addition, the first coil spring 64 is supported by the outer locking portion 62b of the drive plate 62 and the outer locking portion 63b of the driven plate 63 so as to be elastically deformable in the rotational direction.

Second Elastic Member—the Second Coil Spring 65

As the second elastic body constituting the second damper D2, the second coil spring 65 has a function of elastically connecting the drive plate 62 and the driven plate 63 to be described later in the rotational direction to transmit the torque while absorbing the torsional vibration, and is supported in the rotation axis (X-X) direction and the radial direction by the inner side surface of the piston 61 and the inner holding protrusion 62e of the drive plate 62 in the radially more inner side than the first coil spring 64 described above.

The second coil spring 65 is supported by the inner locking portion 62d of the drive plate 62 so as to be elastically deformable in the rotational direction. However, as shown in FIG. 3, unlike the first coil spring 64, in the initial state in which the torque converter 1 is not operated, the second coil spring 65 is configured to be maintained to be spaced apart from an inner locking portion 63c of the driven plate 63 by a predetermined angle a.

That is, as shown in FIG. 3, both ends of the first coil spring 64 are always in contact with the outer locking portion 62b of the drive plate 62 and the outer locking portion 63b of the driven plate 63, but the second coil spring 65 remains in a non-contact state with the inner locking portion 63c of the driven plate 63 in the initial state.

Therefore, after the torque is input to the piston 61 and the drive plate 62 and then the first coil spring 64 is compressed to a degree corresponding to the angle a, the inner locking portion 63c of the driven plate 63 is in contact with the second coil spring 65, and then the compression for the second coil spring 65 starts.

This is configured so that the second coil spring 65 additionally and auxiliarily acts as the second damper D2 in a state where the first coil spring 64 is compressed to a predetermined amount or more, preferably to the maximum, and then it is no longer expected to serve as the damper, and accordingly the first coil spring 64 acting as a main damper may be made smaller in size than in the prior art, so that the torque converter 1 may be miniaturized, and the manufacturing cost may be significantly reduced compared with the prior art.

Driven Plate

The driven plate 63 is connected to the turbine 4 so as to rotate integrally with the turbine 4, and acts as an output member provided so as to be able to rotate relatively to the piston 61 and the drive plate 62 so as to finally output the torque transmitted via the first coil spring 64 and the second coil spring 65 from the piston 61 and the drive plate 62 as the input member to the output hub 43. The configuration of the driven plate 63 is shown in detail in FIG. 5 and FIG. 6.

Figure 5:
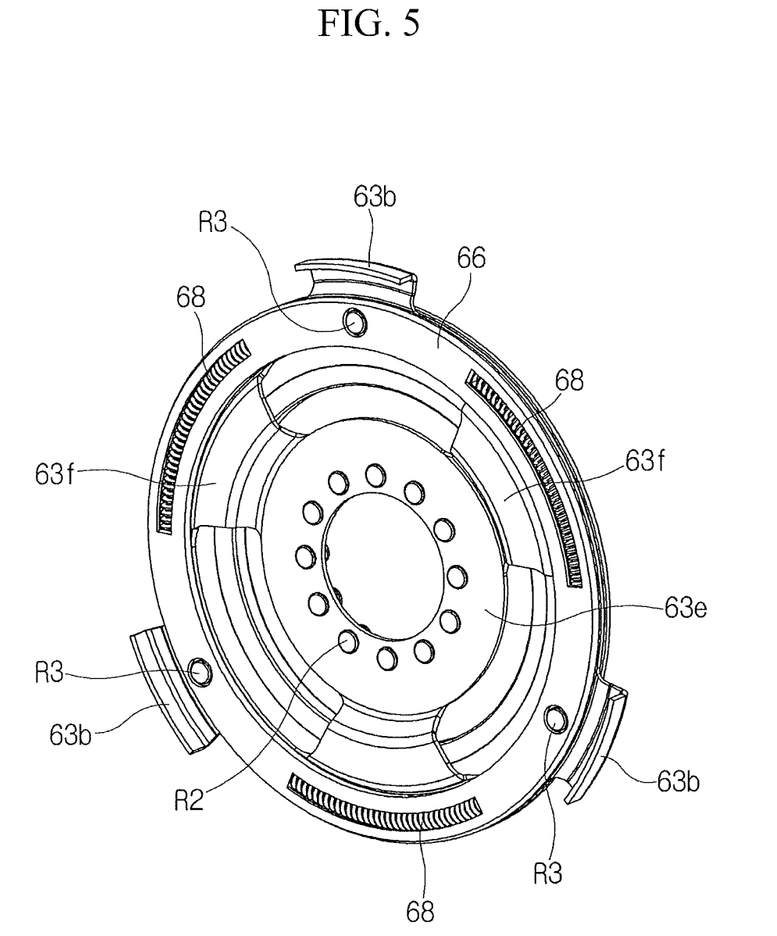
FIG. 5 is a perspective view of a driven plate and a dynamic damper assembly of a lock-up device according to an exemplary embodiment of the present invention.
Figure 6:
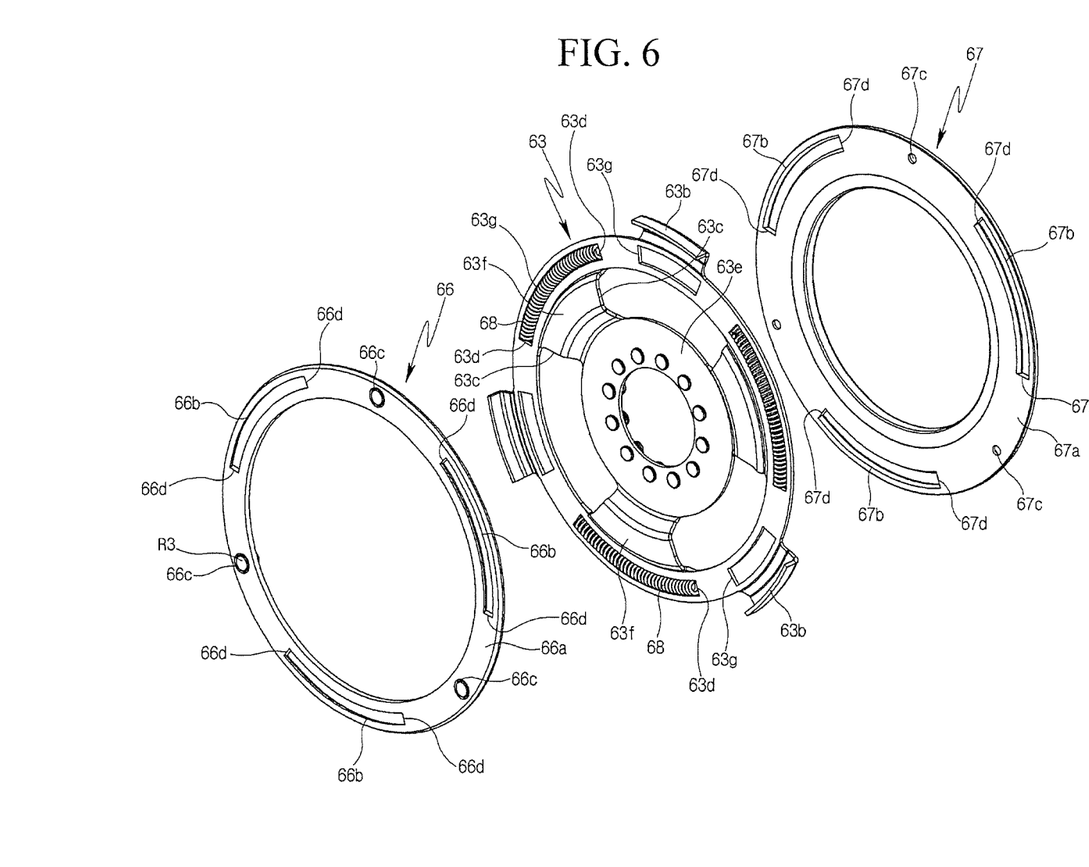
FIG. 6 is an exploded perspective view of FIG. 5.

Referring to FIG. 5 and FIG. 6, the driven plate 63 has an outer body portion 63a of a ring shape, an inner body portion 63e of a ring shape, and a connection part 63f connecting the outer body portion 63a and the inner body portion 63e in a bridge shape, and the inner body portion 63e is simultaneously fixed to the output hub 43 and the turbine shell 41 through a plurality of rivets R2.

In the outer body portion 63a, an outer locking portion 63b to which the torque is transmitted through the first coil spring 64, a first spring hole 63g accommodating a third coil spring 68 of the dynamic damper DD to be described later, and a stopper hole 63h limiting a rotation range of the mass body of the dynamic damper DD.

The outer locking portion 63b as a part extending by bending the part of the exterior circumference of the outer body portion 63a of the ring shape in the rotation axis (X-X) direction is formed in plural throughout the exterior circumference of the body portion 63a, is disposed between the ends of a plurality of first coil springs 64, and supports the end of the first coil spring 64 in the rotational direction.

In order to maintain the contact state for the first coil spring 64, the width in the direction of the rotation of the outer locking portion 63b of the driven plate 63 is set to be substantially equal to the width in the rotational direction of the outer locking portion 62b of the drive plate 62 as shown in FIG. 3.

The first spring hole 63g is formed in plural numbers corresponding to the number of the third coil springs 68 in the circumferential direction so as to accommodate the third coil springs 68 constituting the dynamic damper DD, and both end surfaces of the first spring hole 63g are maintained in contact with the third coil spring 68 to act as an intermediate locking portion 63d on which the elastic force of the third coil spring 68 acts.

The stopper hole 63h as a part where the rivet R3 integrally connecting a first mass plate 66 and a second mass plate 67 of the dynamic damper DD described later penetrates and extends is formed between the above-described first spring holes 63g and extends with a predetermined length in the rotational direction. The relative rotation amount of the driven plate 63 with respect to the first mass plate 66 and the second mass plate 67 mentioned later is limited by the length of the rotational direction of the stopper hole 63h.

The connection part 63f as a part integrally connecting the outer body portion 63a and the inner body portion 63e in the bridge shape may be preferably manufactured by a method of partially removing the intermediate part between the outer body portion 63a and the inner body portion 63e of a plate member through a press process for a plate member of a circular plate shape. Both side surfaces of the connecting portion 63f are in contact with the second coil spring 65 in the torque transmission process to act as an inner locking portion 63c compressing the second coil spring 65.

Inertial Mass Body

As the inertial mass body constituting the dynamic damper DD, the lock-up device 6 according to an exemplary embodiment of the present invention includes the first mass plate 66 and the second mass plate 67 that are disposed to be respectively in close contact with both side surfaces of the outer body portion 63a of the driven plate 63 to be relatively rotated with respect to the driven plate 63 as the output member.

Figure 7:
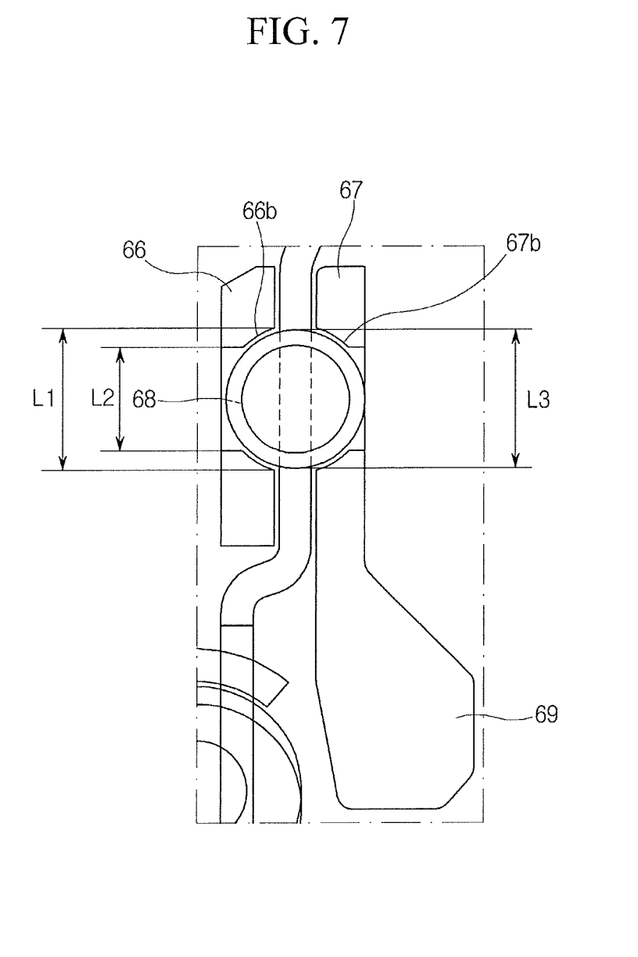
FIG. 7 is a cross-sectional view of a driven plate and a dynamic damper assembly shown in FIG. 5 in a rotation axis line direction.

As shown in FIG. 6 and FIG. 7, the first mass plate 66 and the second mass plate 67 of the driven plate 63 are formed of the ring member of the plate shape similar to the shape of the outer body portion 63a and disposed to be in close contact with both side surfaces of the outer body portion 63a of the driven plate 63, respectively.

Also, the first mass plate 66 and the second mass plate 67 are disposed in the space between the first coil spring 64 and the second coil spring 65 in the radial direction and simultaneously disposed to at least partially overlap the first coil spring 64 with respect to the rotation axis (X-X) direction when viewing in the radial direction, and preferably, the first mass plate 66 and the later-described third coil spring 68 are disposed to overlap the first coil spring 64 with respect to the rotation axis (X-X) direction.

That is, the inertial masses, which are conventionally provided as a single body, are divided and disposed on both side surfaces of the driven plate 63 in the form of a ring-shaped plate to minimize the space occupied by the inertial masses, and are arranged in the space between the first coil spring 64 and the second coil spring 65, which is not in a range out of the first coil spring 64 in the radial direction to significantly reduce the radial direction dimension of the lockup device 6. Furthermore, in the radial direction, the first mass plate 66 and the second mass plate 67 are at least partially overlapped with the first coil spring 64 with respect to the rotation axis (X-X) direction so that the dimension of the rotation axis (X-X) direction of the lock-up device 6 may be reduced.

At this time, the first mass plate 66 and the second mass plate 67 are fastened to each other through the aforementioned rivet R3 so as to have the same effect as a single mass and are integrally operated. To this end, rivet holes 66c and 67c are formed in a body portion 66a of the first mass plate 66 and a body portion 67a of the second mass plate 67, respectively, through which the rivet R3 extends. As described above, since the rivet R3 extends through the stopper hole 63h of the driven plate 63, the relative rotational amount of the driven plate 63 with respect to the first mass plate 66 and the second mass plate 67 is limited to the length of the rotational direction of the stopper hole 63h by the interaction of the rivet R3 and the stopper hole 63h.

In addition, the first mass plate 66 and the second mass plate 67 are configured to be directly connected to a third elastic body, preferably the third coil spring 68, which is a damper spring, without an intermediate connecting member, unlike the prior art.

To this end, the first mass plate 66 and the second mass plate 67 include a second spring hole 66b and a third spring hole 67b, respectively, and by cooperating with each other so as to accommodate the third coil spring 68, and both end surfaces of each of the second spring hole 66b and the third spring hole 67b contact both ends of the third coil spring 68 to act as spring locking portions 66d and 67d pressing both ends of the third coil spring 68 during the damping action.

The second spring hole 66b and the third spring hole 67b are formed to have substantially the same length of the rotational direction as the first spring hole 63g of the driven plate 63 described above.

As such, the first mass plate 66 and the second mass plate 67 are configured to be directly connected to the third coil spring 68 without an intermediate connecting member, unlike the conventional art, thereby simplifying the structure of the lockup device 6 and additionally significantly reducing the manufacturing cost.

Also, as shown in FIG. 7, for the second spring hole 66b and the third spring hole 67b of the first mass plate 66 and the second mass plate 67, the radial direction width L1 of the inner surface toward the driven plate 63 may be formed to be larger than the radial direction width L2 of the outer surface, and the radial direction width L2 of the outer surface may be formed to be smaller than the exterior diameter L3 of the third coil spring 68.

In this manner, by setting the relationship of the radial direction width L1 of the inner surfaces and the radial direction width L2 of the outer surfaces of the second spring holes 66b and the third spring holes 67b of the first mass plate 66 and the second mass plate 67, the axial direction support and the release prevention structures of the third coil spring 68 may be implemented without separately providing additional members or an additional process for the first mass plate 66 and the second mass plate 67.

Furthermore, it is necessary to increase the damping capability of the dynamic damper DD according to the magnitude of the torque transmitted to the driven plate 63 and the resonance frequency while minimizing the space occupied by the inertial mass. For this purpose, an additional mass 69 may be included to increase the inertia of the inertial mass.

The additional mass body 69, as shown in FIG. 7, may be formed to have a ring shape extending from the inner surface of the second mass plate 67 in the radial direction to the radial direction inside, and may be provided integrally to the second mass body. At this time, the additional mass 69 is preferably configured to have a cross-sectional shape corresponding to the shape of the space between the second coil spring 65 and the turbine shell 41 in order to increase the space utilization.

However, the shape and size of the additional mass 69 shown in this case may be variously modified and applied according to the required damping ability, and such modifications are naturally within the scope of the present invention.

Figure 8:
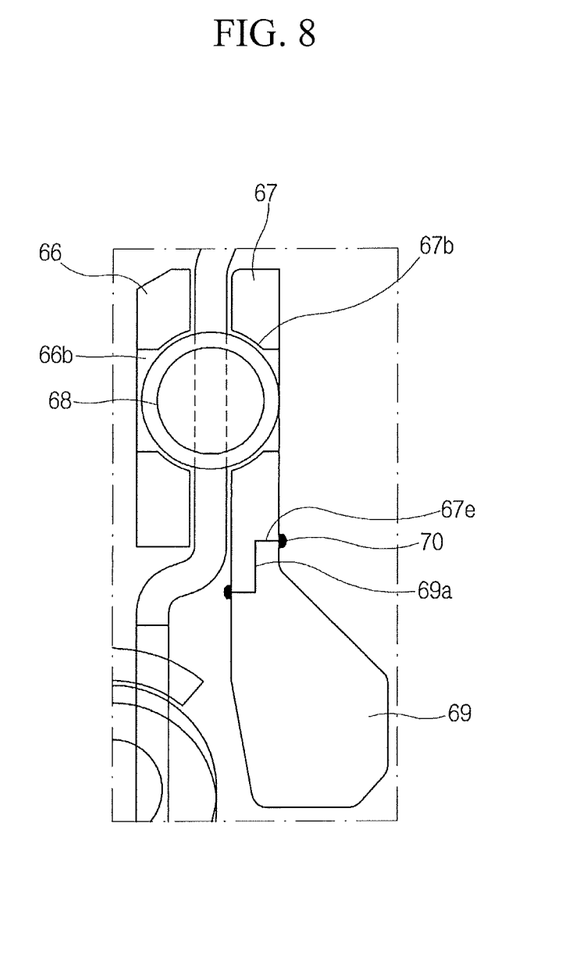
FIG. 8 is a cross-sectional view of a driven plate and a dynamic damper assembly of a lock-up device in a rotation axis line direction according to another exemplary embodiment of the present invention.

In FIG. 8, as another embodiment of the lock-up device 6 according to the present invention, a configuration in which an additional mass 69 is manufactured separately from the second mass plate 67 to be fastened and fixed to the second mass plate 67 is shown.

As described above, it is necessary to apply the damping capability of the dynamic damper DD differently according to the magnitude of the torque transmitted to the driven plate 63 and the resonance frequency. The additional mass 69 is designed and optimized to suit the torque and the resonant frequency, and the damping capability of the dynamic damper DD may be changed and applied by the method of fastening the optimized additional mass 69 to the second mass plate 67.

In this manner, by manufacturing the additional mass 69 separately from the second mass plate 67, it is possible to commonly share the components of the dynamic damper DD except for the additional mass 69, thereby significantly reducing the cost of manufacturing the torque converter compared to the prior art.

FIG. 8 shows an exemplary embodiment in which a first coupling portion 67e having a stepped shape is formed on the second mass plate 67, a second coupling portion 69a having a stepped shape corresponding to the additional mass 69 is formed, and a welding portion 70 is formed at the coupling position thereof to be fixed to each other, however the present invention is not limited thereto, and the connection structure and the fastening method between the second mass plate 67 and the additional mass 69 may be applied with various modifications, and such modifications are naturally within the scope of the present invention.

Third Elastic Member

In a state in which the third coil spring 68 as a third elastic member elastically connecting the first mass plate 66 and the second mass plate 67, and the driven plate 63 of the output member with respect to the rotational direction, is inserted into the first spring hole 63g of the driven plate 63, both ends thereof are supported by the intermediate locking portion 63d of the first spring hole 63g, and the spring locking portions 66d and 67d of the first mass plate 66 and the second mass plate 67, to be elastically deformable in the rotational direction.

Therefore, if the driven plate 63, the first mass plate 66, and the second mass plate 67 are rotated relative to each other, the third coil spring 68 is compressed in the rotational direction, and thus a vibration having a phase opposite to that of the vibration input to the driven plate 63 is applied to the driven plate 63 so that the torque in a state where the vibration is attenuated is finally transmitted to the output hub 43.

<Operation of a Torque Converter>

Figure 9:
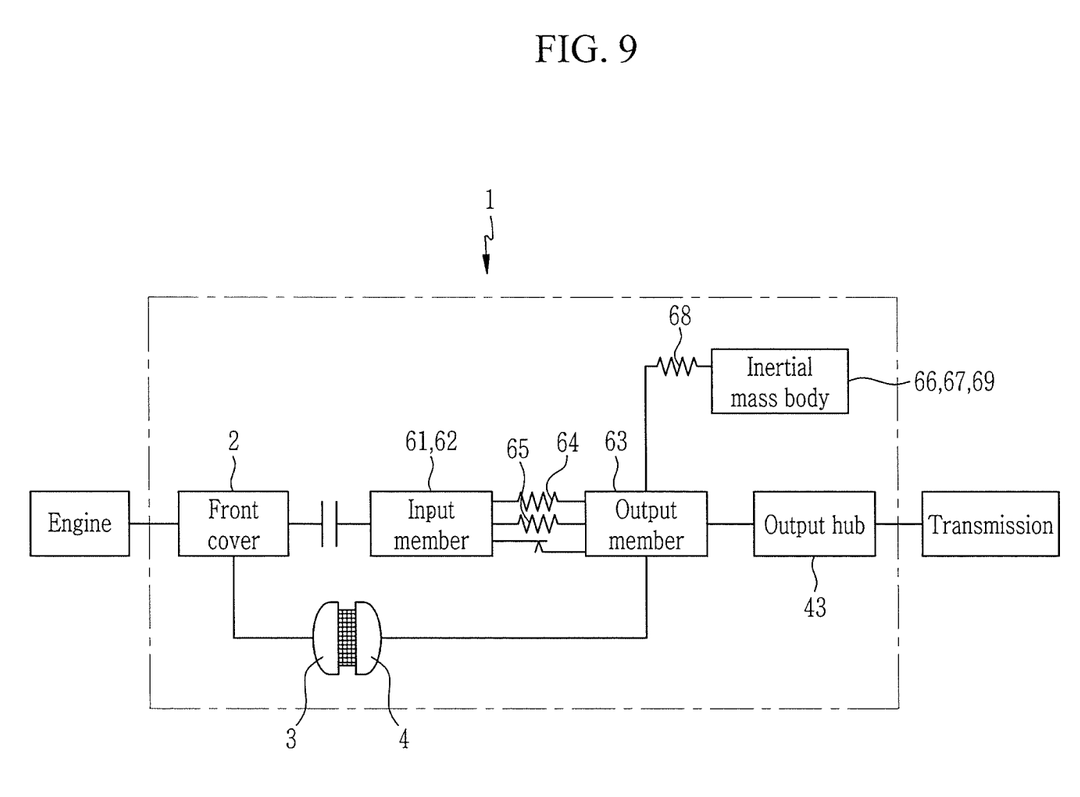
FIG. 9 is a schematic diagram for explaining a torque transmission process of a torque converter.

Next, the operation of the torque converter 1 including the lock-up device 6 according to an exemplary embodiment of the present invention is described with reference to FIG. 9.

In the state where the front cover 2 and the impeller 3 are rotating, the hydraulic oil flows from the impeller 3 to the turbine 4, and the power is transmitted from the impeller 3 to the turbine 4 via the hydraulic oil. The power transmitted to the turbine 4 is transmitted to the input shaft of the transmission, not shown, via the output hub 43.

If the rotational speed of the input shaft remains approximately constant, the power transfer through the lockup device 6 is started. More specifically, the piston 61 moves to the engine side according to the change in the hydraulic pressure, and the friction member 61a of the piston 61 is pressed toward the inner side surface of the front cover 2.

As a result, the piston 61 rotates integrally with the front cover 2, and the power is transmitted from the front cover 2 to the drive plate 62 via the piston 61.

If the power is transmitted to the drive plate 62, while the first coil spring 64 is primarily compressed in the rotational direction between the outer locking portion 62b of the drive plate 62 and the outer locking portion 63b of the driven plate 63, and the second coil spring 65 is secondarily compressed in the rotational direction between the inner locking portion 62d of the drive plate 62 and the inner locking portion 63c of the driven plate 63, the power of which the torsional vibration is attenuated is transmitted to the driven plate 63.

On the other hand, if the power is transmitted to the driven plate 63, the third coil spring 68 is compressed in the rotational direction between the intermediate locking portion 63d of the driven plate 63, and the spring locking portions 66d and 67d of the first mass plate 66 and the second mass plate 67, and the vibration having a phase opposite to that input to the driven plate 63 is transmitted to the driven plate 63 through the third coil spring 68.

As a result, the power of which the vibration is finally attenuated is transmitted to the turbine 4 and the output hub 43 via the driven plate 63.

As described above, those skilled in the art will appreciate that the present invention may be carried out in other specific ways than those set forth herein without departing from the spirit and essential characteristics of the present invention.

Therefore, the present invention is not limited to the examples described above and covers modifications of the technical spirit substantially equivalent thereto, and the scope of the invention is defined not by the detailed description of the invention but by the appended claims, and all differences within the scope will be construed as within the scope of the present invention.

DESCRIPTION OF SYMBOLS

1: torque converter 2: front cover
3: impeller 4: turbine
5: stator 6: lock-up device
61: piston 62: drive plate
63: driven plate 64: first coil spring
65: second coil spring 66: first mass plate
67: second mass plate 68: third coil spring
69: additional mass body

What is claimed is:

1. A lock-up device for a torque converter disposed between a front cover connected to an engine output side and a turbine, comprising:
an input member to which a torque is input from the front cover through a friction force;
an output member connected to the turbine to be integrally rotated and provided to be relatively rotatable with respect to the input member;
a first elastic member and a second elastic member elastically connecting the input member and the output member in a rotational direction, respectively; and
a dynamic damper directly installed to the output member, the dynamic damper including an inertial mass body disposed to be in close contact with the output member so as to be relatively rotatable with respect to the output member, and a third elastic member elastically connecting the inertial mass body and the output member with respect to the rotational direction,
wherein the inertial mass body includes:
a first mass plate disposed in close contact with a first side surface of the output member; and
a second mass plate disposed in close contact with a second side surface of the output member and integrally rotating with the first mass plate,
wherein the first elastic member is disposed outside in a radial direction with respect to the second elastic member, and
wherein the dynamic damper is disposed between the first elastic member and the second elastic member in the radial direction, and
wherein the first mass plate and the third elastic member are disposed to entirely overlap the first elastic member with respect to a rotation axis direction when viewing in the radial direction.

2. The lock-up device for the torque converter of claim 1, wherein
the dynamic damper further includes:
an additional mass body to increase inertia, and
the additional mass body is disposed in the radial direction inside of the second mass plate and is connected to the second mass plate.

3. The lock-up device for the torque converter of claim 2, wherein
the additional mass body is integrally formed with the second mass plate.

4. The lock-up device for the torque converter of claim 2, wherein
the additional mass body is manufactured separately from the second mass body plate and is fixed to the second mass plate.

5. The lock-up device for the torque converter of claim 1, wherein
a compression of the second elastic member is started after the first elastic member is maximally compressed by the rotation of the input member.

* * * * *